United States Patent
Lee et al.

(10) Patent No.: US 9,019,438 B2
(45) Date of Patent: Apr. 28, 2015

(54) POLARIZATION SYSTEM AND THREE-DIMENSIONAL IMAGE DISPLAY APPARATUS HAVING THE SAME

(75) Inventors: Sang-Gu Lee, Seoul (KR); Hee Wook Do, Cheonan-si (KR); Tecksoo Kim, Gyeonggi-do (KR); Seungbeom Park, Seoul (KR); DuckJong Suh, Seoul (KR); Min Oh Choi, Asan-si (KR)

(73) Assignee: Samsung Display Co., Ltd. (KR)

( * ) Notice: Subject to any disclaimer, the term of this patent is extended or adjusted under 35 U.S.C. 154(b) by 322 days.

(21) Appl. No.: 13/464,816

(22) Filed: May 4, 2012

(65) Prior Publication Data

US 2013/0141654 A1  Jun. 6, 2013

(30) Foreign Application Priority Data

Dec. 6, 2011 (KR) .......... 10-2011-0129848

(51) Int. Cl.
  *G02F 1/1335* (2006.01)
  *G02B 27/26* (2006.01)
  *H04N 13/04* (2006.01)
  *G02F 1/13363* (2006.01)

(52) U.S. Cl.
  CPC ............ *G02B 27/26* (2013.01); *G02F 1/13363* (2013.01); *G02F 2001/133562* (2013.01); *H04N 13/0409* (2013.01)

(58) Field of Classification Search
  CPC ....... G02B 27/22; G02B 27/26; G02F 1/0311
  USPC .............................. 349/15, 96–103, 117–121
  See application file for complete search history.

(56) References Cited

U.S. PATENT DOCUMENTS

| | | | | |
|---|---|---|---|---|
| 6,002,518 | A * | 12/1999 | Faris | 359/465 |
| 2007/0076155 | A1* | 4/2007 | Nakayama et al. | 349/118 |
| 2010/0302634 | A1 | 12/2010 | Jung | |
| 2012/0044431 | A1* | 2/2012 | Osterman et al. | 349/15 |

FOREIGN PATENT DOCUMENTS

| | | |
|---|---|---|
| JP | 05-257083 | 10/1993 |
| JP | 10-0239641 | 9/1998 |
| JP | 2010-020274 | 1/2010 |
| KR | 10-2007-0095101 | 9/2007 |
| KR | 10-2010-0006461 A | 1/2010 |
| KR | 10-2010-0128973 A | 12/2010 |
| KR | 10-2010-0137695 A | 12/2010 |

* cited by examiner

*Primary Examiner* — Paisley L Arendt
(74) *Attorney, Agent, or Firm* — Innovation Counsel LLP

(57) ABSTRACT

A 3D image display apparatus featuring a new polarization system is introduced which minimizes crosstalk between stereoimages. The polarization system includes a shutter panel that shifts the phase of an incident light, a polarizing film disposed between the shutter panel and an observer, a first retardation film disposed between the shutter panel and the polarizing film, a second retardation film disposed between the polarizing film and the first retardation film to correspond to the left eye of the observer, and a third retardation film disposed between the polarizing film and the first retardation film to correspond to the right eye of the observer.

11 Claims, 10 Drawing Sheets

POLARIZATION SYSTEM AND THREE-DIMENSIONAL IMAGE DISPLAY APPARATUS HAVING THE SAME

CROSS-REFERENCE TO RELATED APPLICATION

This application relies for priority upon Korean Patent Application No. 10-2011-0129848 filed on Dec. 6, 2011, the contents of which are herein incorporated by reference in its entirety.

BACKGROUND

1. Field of Disclosure

The present invention relates to a light polarization system and a three-dimensional (3D) image display apparatus having the same. More particularly, the present invention relates to a polarization system capable of reducing a stereoimaging crosstalk phenomenon and a 3D image display apparatus having the polarization system.

2. Description of the Related Art

A typical 3D image display apparatus alternately provides a left-eye image and a right-eye image through a display panel, while an observer sees the left-eye image and the right-eye image through polarizing glasses whose left and right eye polarizers are orthogonal.

The display panel includes a retardation film having a phase difference of about $\lambda/4$. The retardation film is attached on the side of the display panel from which light exits. The retardation film causes a phase shift of $\lambda/4$ to the light having a specific wavelength, $\lambda$. Because the left eye polarizer in the polarizing glasses is orthogonal to the right eye polarizer, when the polarized right-eye image is displayed on the display panel, the right-eye image does not pass through the left-eye polarizer to the observer's left eye. Similarly, the observer's right eye cannot see the left-eye image when it is displayed on the display panel.

Since the retardation film suffers from the property of light dispersion, however, only the light having the specific wavelength $\lambda$ is retarded by a phase shift of exactly $\lambda/4$. That is, the phase shift to the light having other wavelengths $\lambda'$ is smaller or larger than $\lambda'/4$.

As a result, a crosstalk phenomenon in which one of the left-eye image or the right-eye image affects the other image occurs, especially for images rich in colors far from the retardation wavelength $\lambda$, while the observer watches the image displayed on the 3D image display apparatus. Some observers may feel discomfort while watching a 3D image which displays the crosstalk phenomenon.

SUMMARY

Exemplary embodiments of the present invention provide a polarization system capable of reducing a crosstalk phenomenon.

Exemplary embodiments of the present invention provide a 3D image display apparatus having the polarization system.

According to the exemplary embodiments, a polarization system includes a shutter panel, a polarizing film, a first retardation film, a second retardation film, and a third retardation film. The shutter panel shifts a phase of incident light, and the polarizing film is disposed between the shutter panel and an observer. The first retardation film is disposed between the shutter panel and the polarizing film. The second retardation film is disposed between the polarizing film and the first retardation film to correspond to a left eye of the observer, and the third retardation film disposed between the polarizing film and the first retardation film to correspond to a right eye of the observer.

The first retardation film may have a slow axis substantially parallel to a slow axis of the second retardation film, and the slow axis of the first retardation film may cross a slow axis of the third retardation film.

The first retardation film may have a light dispersion property different from a light dispersion property of the second retardation film, and the third retardation film may have a light dispersion property that is substantially the same as the light dispersion property of the first retardation film.

The polarization system may further include a dispersion compensation film disposed between the shutter panel and the first retardation film, and the shutter panel may include a first substrate, a second substrate facing the first substrate, and a twisted nematic liquid crystal disposed between the first substrate and the second substrate.

In another aspect the invention pertains to a 3D image display apparatus including a display panel that displays an image and a polarization system disposed between the display panel and an observer. The polarization system includes a shutter panel disposed between the display panel and the observer, a polarizing film disposed between the shutter panel and the observer, a first retardation film disposed between the shutter panel and the polarizing film, a second retardation film disposed between the polarizing film and the first retardation film to correspond to a left eye of the observer, and a third retardation film disposed between the polarizing film and the first retardation film to correspond to a right eye of the observer.

According to the above, the polarization system may prevent optical crosstalk. Thus, the observer may be prevented from feeling discomfort due to the optical crosstalk when the observer watches the 3D image displayed on the 3D image display apparatus employing the polarization system.

BRIEF DESCRIPTION OF THE DRAWINGS

The above and other advantages of the present invention will become readily apparent by reference to the following detailed description when considered in conjunction with the accompanying drawings.

DETAILED DESCRIPTION

Figure 1:
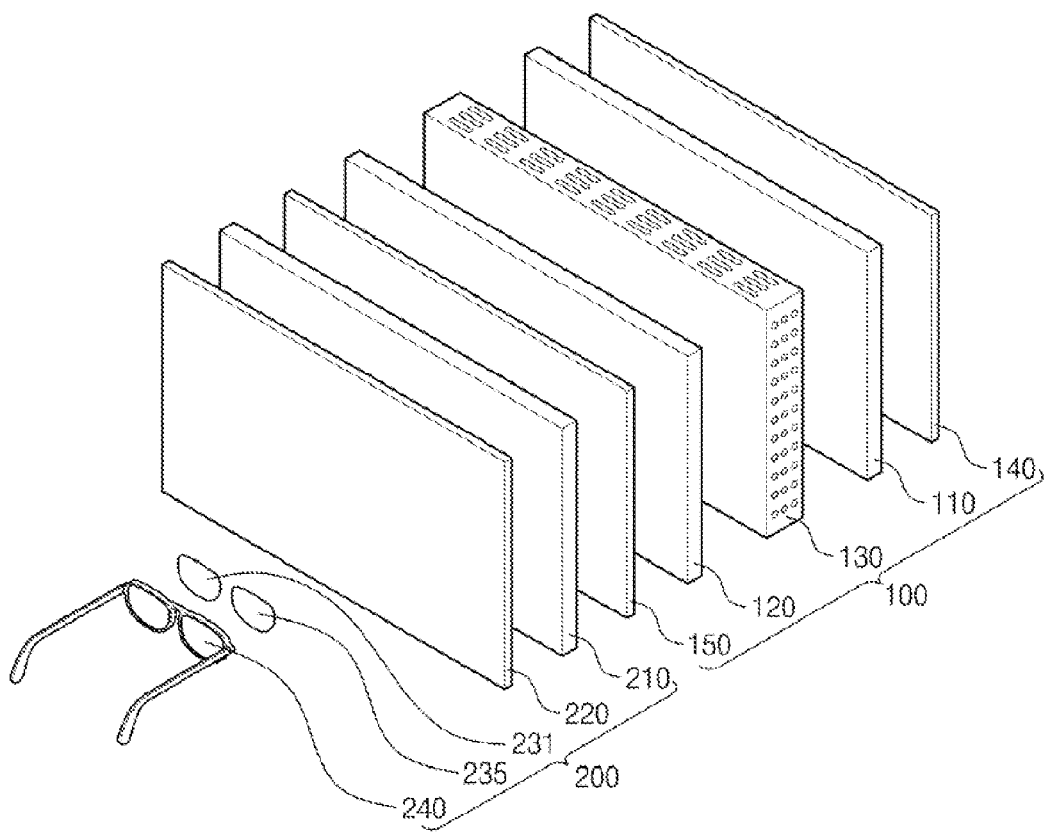
FIG. 1 is an exploded perspective view showing a 3D image display apparatus according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is an exploded perspective view showing a 3D image display apparatus according to an exemplary embodiment of the present invention.

Figure 2:
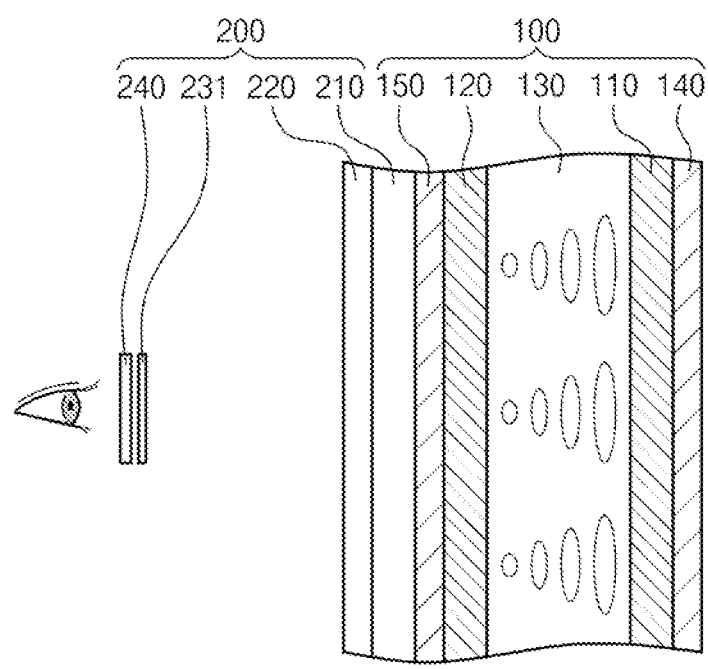
FIG. 2 is a cross-sectional view showing a left-eye image of the 3D image display apparatus shown in FIG. 1.

FIG. 2 is a cross-sectional view showing a left-eye image of the 3D image display apparatus shown in FIG. 1.

Figure 3:
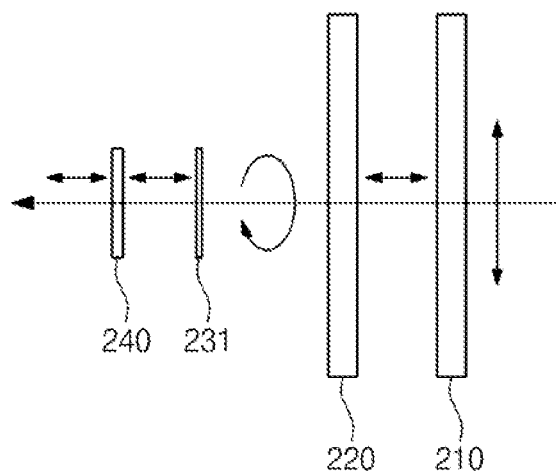
FIG. 3 is a view showing a left-eye polarization system in the 3D image display apparatus shown in FIG. 1.

FIG. 3 is a view showing the left-eye polarization system in the 3D image display apparatus shown in FIG. 1.

Figure 4:
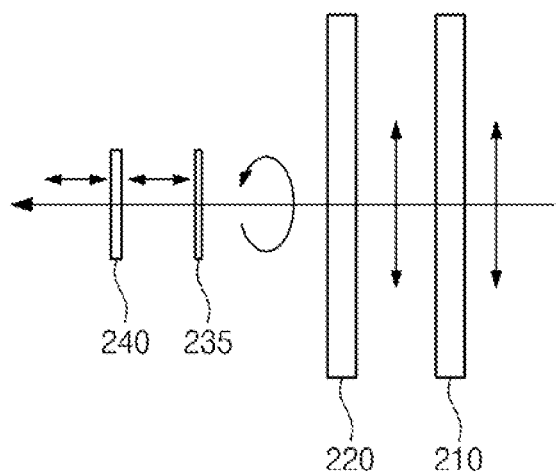
FIG. 4 is a view showing a right-eye polarization system in the 3D image display apparatus shown in FIG. 1.

FIG. 4 is a view showing the right-eye polarization system in the 3D image display apparatus shown in FIG. 1.

Figure 5:
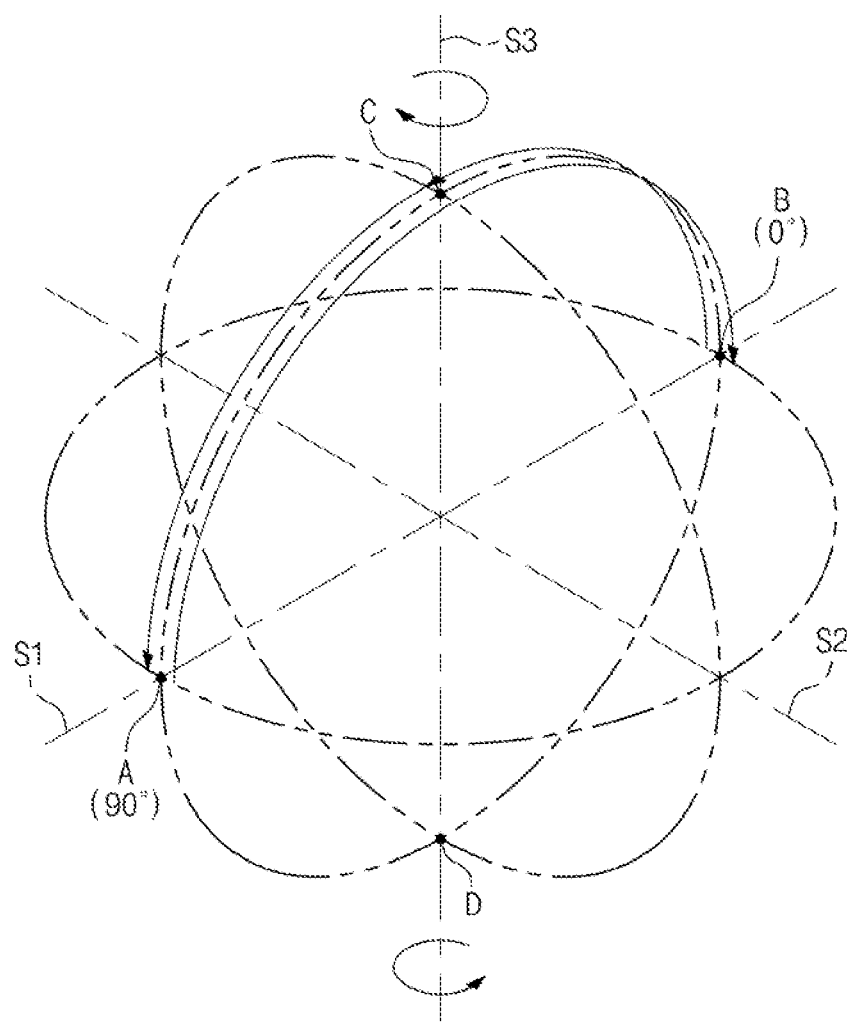
FIG. 5 is the Poincare sphere showing the phase shift of the left-eye image.

FIG. 5 is the Poincare sphere showing the phase shift of a left-eye image.

Figure 6:
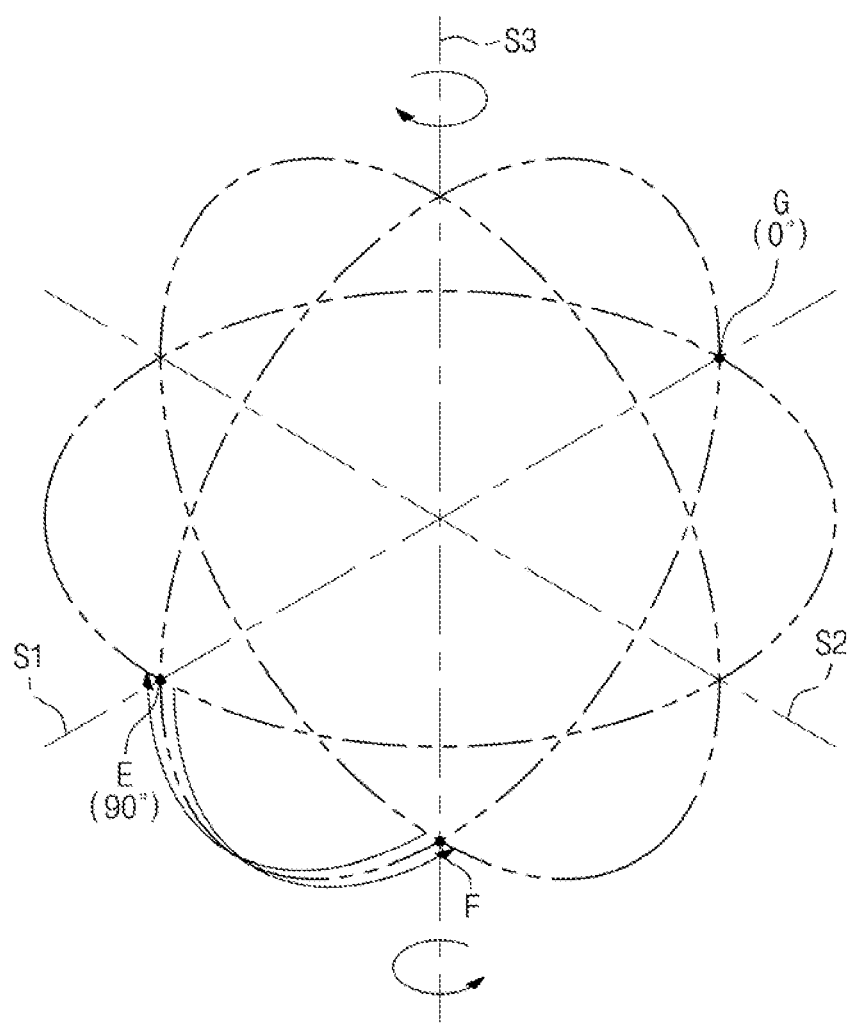
FIG. 6 is the Poincare sphere showing the phase shift of the right-eye image.

FIG. 6 is the Poincare sphere showing the phase shift of a right-eye image.

Figure 7:
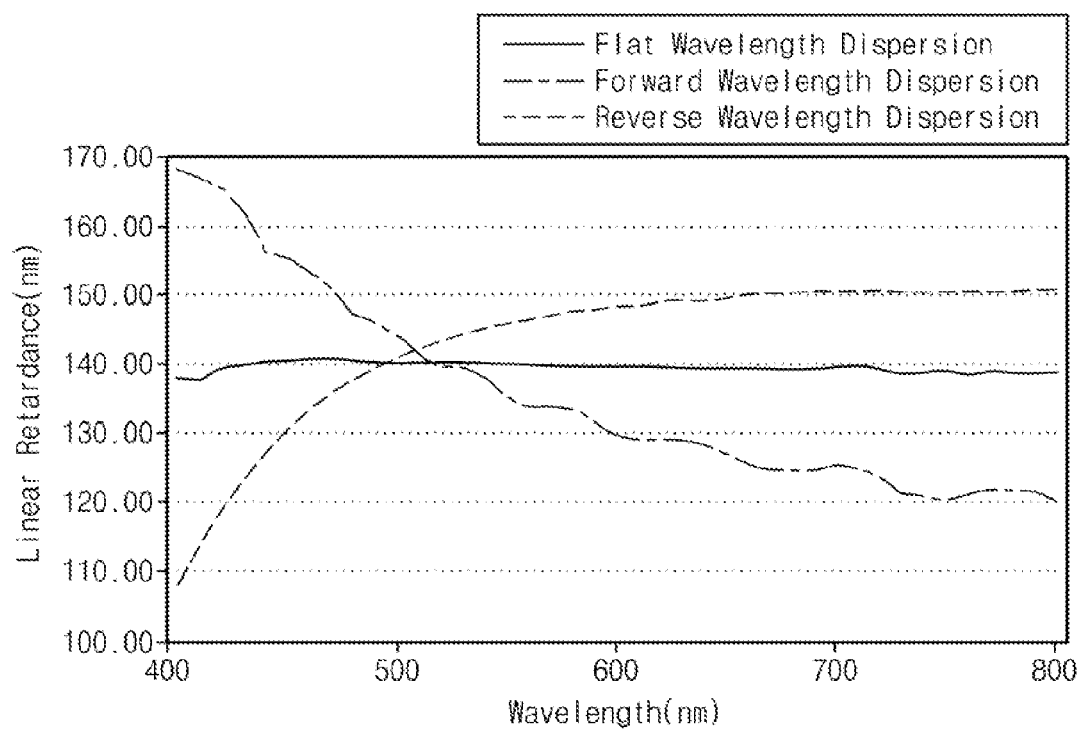
FIG. 7 is a graph showing phase differences of retardation films with three shapes.

FIG. 7 is a graph showing phase differences of retardation films with three shapes.

Referring to FIGS. 1 to 7, the 3D image display apparatus includes a display panel 100 and a polarization system 200.

The display panel 100 alternately displays the left-eye image and the right-eye image. In the present exemplary embodiment, the display panel 100 may be, but is not limited to, various display panels, such as a liquid crystal display panel (LCD), an electrophoretic display panel (EPD), an organic light emitting display (OLED) panel, a plasma display panel (PDP), etc. The liquid crystal display will be described as a representative example of the display panel 100.

Referring to FIGS. 1 and 2, the display panel 100 has a rectangular plate shape with two long sides and two short sides, and displays the image through a predetermined area thereof. The display panel 100 includes an array substrate 110, an opposite substrate 120 facing the array substrate 110, and a liquid crystal layer 130 interposed between the array substrate 110 and the opposite substrate 120.

According to the present exemplary embodiment, the array substrate 110 includes a plurality of pixel areas (not shown) arranged in a matrix form. Each pixel includes a plurality of sub-pixels, each of which has one of red, green, or blue colors. In addition, each pixel includes a gate line (not shown) extending in a first direction substantially parallel to a side of the array substrate 110, a data line (not shown) extending in a second direction crossing the first direction and insulated from the gate line, a pixel electrode (not shown), and a thin film transistor (not shown) electrically connected to the gate line, the data line, and the pixel electrode. The thin film transistor applies a driving signal to the corresponding pixel electrode.

In addition, a driver IC (not shown) is disposed adjacent to a side of the array substrate 110. The driver IC receives various signals from an external device (not shown) and outputs the driving signal to the thin film transistor in response to the various signals.

The opposite substrate 120 includes RGB color filters (not shown) disposed thereon to transmit a predetermined color from the white light of a backlight unit (not shown), and a common electrode (not shown) disposed on the RGB colors to face the pixel electrode. The RGB color filters are formed through a thin film process. In the present exemplary embodiment, the color filters are disposed on the opposite substrate 120, but should not be limited thereto. That is, the color filters may be disposed on the array substrate 110 according to alternate embodiments.

The liquid crystal layer 130 includes liquid crystal molecules arranged in a specific direction in response to an electric field generated between the pixel electrode and the common electrode by voltages applied to the pixel electrode and the common electrode. The display panel 100 includes a first polarizing film 140 disposed between the display panel 100 and the backlight unit to polarize the light from the backlight unit. Accordingly, the liquid crystal layer 130 controls the transmittance of the polarized light from the backlight unit, thereby displaying a desired image on the display panel 100.

The display panel 100 also includes a second polarizing film 150 disposed to face the first polarizing film 140 while interposing the array substrate 110, the opposite substrate 120, and the liquid crystal layer 130 therebetween. The transmission axis of the first polarizing film 140 crosses the transmission axis of the second polarizing film 150. For instance, when the transmission axis of the first polarizing film 140 is about zero degrees, the transmission axis of the second polarizing film 150 is about 90 degrees.

The polarization system 200 is disposed adjacent to a display screen of the display panel 100 and allows the observer's eyes to see separately the images sequentially displayed on the display panel 100 as a single 3D image.

The polarization system 200 includes a shutter panel 210 disposed between the observer and the display panel 100, a first retardation film 220 disposed between the observer and the shutter panel 210, second and third retardation films 231 and 235 disposed between the observer and the first retardation film 220, and a third polarizing film 240 disposed between the observer and the second and third retardation films 231 and 235. The second retardation film 231, the third retardation film 235, and the third polarizing film 240 may be attached to a polarizing glasses for the observer, and the second retardation film 231 and the third retardation film 235 are disposed to correspond to left and right eyes of the observer, respectively.

The shutter panel 210 separates the image displayed on the display panel 100 into the left-eye image and the right-eye image. The shutter panel 210 transmits the light exiting from the display panel 100 or shifts the phase of the light exiting from the display panel. In detail, when no power source is applied to the shutter panel 210, the shutter panel 210 transmits the light exiting the display panel 100, and when the power source is applied to the shutter panel 210, the shutter panel 210 shifts the phase of the light exiting from the display panel 100 by $\lambda/2$.

The first retardation film 220 is disposed between the observer and the shutter panel 210 to shift the phase of the light exiting from the shutter panel 210. For instance, the first retardation film 220 has a slow axis of about −45 degrees and shifts the phase of the light exiting from the shutter panel 210 by $\lambda/4$. In addition, the first retardation film 220 is a flat wavelength dispersion retardation film having flat wavelength dispersion property, and thus the first retardation film 220 uniformly shifts the phase of the light incident thereto without relation to the wavelength of the light as shown in FIG. 7.

The second retardation film 231 and the third retardation film 235 are disposed between the observer and the first retardation film 220 to respectively correspond to the left eye and the right eye of the observer. The second retardation film 231 and the third retardation film 235 shift the phase of the light exiting from the first retardation film 220. For instance, the second retardation film 231 has a slow axis of about −45 degrees, which is substantially parallel to the slow axis of the first retardation film 220, and shifts the phase of the light exiting from the shutter panel 210 by $\lambda/4$. In addition, the second retardation film 231 may have a wavelength dispersion property different from that of the first retardation film 220. That is, the second retardation film 231 may be a retardation film having forward wavelength dispersion property or reverse wavelength dispersion property. In the case of the forward wavelength dispersion retardation film, a phase delay becomes large as the wavelength of the light becomes short as shown in FIG. 7. On the contrary, in the case of the reverse wavelength dispersion retardation film, the phase delay becomes large as the wavelength of the light becomes long.

The third retardation film 235 has a slow axis of about +45 degrees, which is substantially perpendicular to the slow axis of the first retardation film 220, and shifts the phase of the light exiting from the shutter panel 210 by $-\lambda/4$. In addition, the third retardation film 235 has the wavelength dispersion property substantially same as that of the first retardation film 220. That is, the third retardation film 235 may be a flat wavelength dispersion retardation film having the flat wavelength dispersion property.

The third polarizing film 240 is disposed between the observer and the second retardation film 231 and has a transmission axis of about 90 degrees. Accordingly, the third polarizing film 240 selectively transmits the light exiting from the second retardation film 231 and the third retardation film 235.

In the present exemplary embodiment the first retardation film 220 is a flat wavelength dispersion retardation film, the second retardation film 231 is a forward or reverse wavelength dispersion retardation film, and the third retardation film 235 is a flat wavelength dispersion retardation film, but they should not be limited thereto or thereby. That is, when the first retardation film 220 and the third retardation film 235 have the same wavelength dispersion property and the second retardation film 231 has a different wavelength dispersion property from those of the first and third retardation films 220 and 235, the overall wavelength dispersion of the first, second, and third retardation films 220, 231, and 235 may be implemented in various ways. For instance, the first retardation film 220 and the third retardation film 235 may be forward wavelength dispersion retardation films, and the second retardation film 231 may be a reverse or flat wavelength dispersion retardation film. Alternatively, the first retardation film 220 and the third retardation film 235 may be reverse wavelength dispersion retardation films, and the second retardation film 231 may be a forward or flat wavelength dispersion retardation film.

Hereinafter, the process by which the observer perceives the 3D image displayed on the 3D image display apparatus will be described with reference to FIGS. 1 to 6. The light entering the observer's left eye will be described separately from the light entering the right eye of the observer.

The light exiting the backlight unit enters the right eye after sequentially passing through the first polarizing film 140, the array substrate 110, the liquid crystal layer 130, and the opposite substrate 130, then through the second polarizing film 150, the shutter panel 210, the first retardation film 220, the third retardation film 235, and the third polarizing film 240.

In contrast, the light exiting from the backlight unit enters the left eye after sequentially passing through the first polarizing film 140, the array substrate 110, the liquid crystal layer 130, and the opposite substrate 130, the second polarizing film 150, the shutter panel 210, the first retardation film 220, the second retardation film 231, and the third polarizing film 240.

The observer sees the right-eye image as follows.

When the light exits from the backlight unit, the light is transmitted through the first polarizing film 140, the array substrate 110, the liquid crystal layer 130, and the opposite substrate 130, and the second polarizing film 150. The transmission axis of the first polarizing film 140 is about zero degrees and the transmission axis of the second polarizing film 150 is about 90 degrees. Thus, the second polarizing film 150 transmits only the light traveling in a direction substantially parallel to its transmission axis, and thus the light passing through the second polarizing film 150 is linearly polarized. That is, since the transmission axis of the second polarizing film 150 is about 90 degrees, the light exiting from the second polarizing film 150 may be a linearly polarized light, which is polarized at about 90 degrees.

The phase of the linearly polarized light at about 90 degrees after passing through the second polarizing film 150 is shifted by the shutter panel 210. The shutter panel 210 shifts the phase of the linearly polarized light at about 90 degrees by $\lambda/2$. In detail, the phase of the linearly polarized light at about 90 degrees after passing through the second polarizing film 150 is positioned at the "A" position on the Poincare sphere coordinate system shown in FIG. 5. When the linearly polarized light at about 90 degrees passes through the shutter panel 210, the position of the phase of the linearly polarized light is shifted to the "B" position. Thus, the linearly polarized light is polarized at zero degrees after passing through the shutter panel 210.

The phase of the light passing through the shutter panel 210 is shifted by $\lambda/4$ after passing through the first retardation film 220. Accordingly, the light passing through the first retardation film 220 is circularly polarized, and thus the position of the phase of the circularly polarized light is shifted to the "C" position shown in FIG. 5. This is the state of the right-eye image light passing from the display surface on its way to the glasses of the observer.

The phase of the light passing through the first retardation film 220 is shifted by passing through the second retardation film 231 (through the left eyeglass film) or the third retardation film 235 (through the right eyeglass film). Among the light passing through the first retardation film 220, the phase of the light shifted by $\lambda/4$ after passing through the third retardation film 235. Accordingly, the light passing through the third retardation film 235 is converted to linearly polarized light at about 90 degrees as the light provided to the polarizing system 200. Thus the phase of the light passing through the third retardation film 235 shifts again to the "A" position. Consequently, the light passing through the third retardation film 235 is incident on the right eye of the observer after passing through the third polarizing film 240, so the observer perceives the right-eye image through the right eye.

Conversely, of the light passing through the first retardation film 220, the phase of the light is shifted by $-\lambda/4$ after passing through the second retardation film 231 since the first retardation film 220 has the slow axis of about −45 degrees and the second retardation film 231 has the slow axis of about +45 degrees. Thus, the light passing through the second retardation film 231 is converted to linearly polarized light at zero degrees, and thus the phase of the light passing through the second retardation film 231 is shifted to the "B" position, which is opposite to the "A" position of the light provided to the polarizing system 200. Consequently, the light passing through the second retardation film 231 does not transmit through the third polarizing film 240, so the observer does not perceive the right-eye image through the left eye.

The observer sees the left-eye image as follows.

Since the transmission axis of the second polarizing film 150 is about 90 degrees, the light is linearly polarized at about 90 degrees by passing through the second polarizing film 150. That is, the phase of the linearly polarized light at about 90 degrees after passing through the second polarizing film 150 is at the "E" position on the coordinate system of the Poincare sphere shown in FIG. 6.

The linearly polarized light after passing through the second polarizing film 150 transmits through the shutter panel 210 without changing the phase of the linearly polarized light. Accordingly, the position of the phase of the light passing through the shutter panel 210 remains at the "E" position shown in FIG. 6.

The phase of the light passing through the shutter panel 210 is shifted by passing through the second retardation film 231 and through the third retardation film 235. The phase of the light is shifted by $\lambda/4$ after passing through the first retardation film 220. Accordingly, the light passing through the first retardation film 220 is converted to circularly polarized light in a counter-clockwise direction. Thus, the phase of the light passing through the first retardation film 220 shifts to the "F" position shown in FIG. 6.

The phase of the light passing through the first retardation film 220 is shifted by $\lambda/4$ after passing through the third retardation film 235. Hence, the light passing through the third retardation film 235 is converted to linearly polarized light at zero degrees, and its phase shifts to the of the light provided to the polarizing system 200. As a result, light passing through the third retardation film 235 is not transmitted through the third polarizing film 240, so the observer does not perceive the left-eye image through the right eye.

In addition, after the light passes through the first retardation film 220, the phase of the light is shifted by $\lambda/4$ after passing through the second retardation film 231. Accordingly, the light passing through the second retardation film 231 is converted to linearly polarized light at about 90 degrees to the light provided to the polarizing system 200, and thus the position of the phase of the light passing through the third retardation film 235 is shifted again to the "E" position. Consequently, the light passing through the second retardation film 231 is incident into the right eye of the observer after passing through the third polarizing film 240, so the observer perceives the left-eye image through the left-eye.

Figure 8:
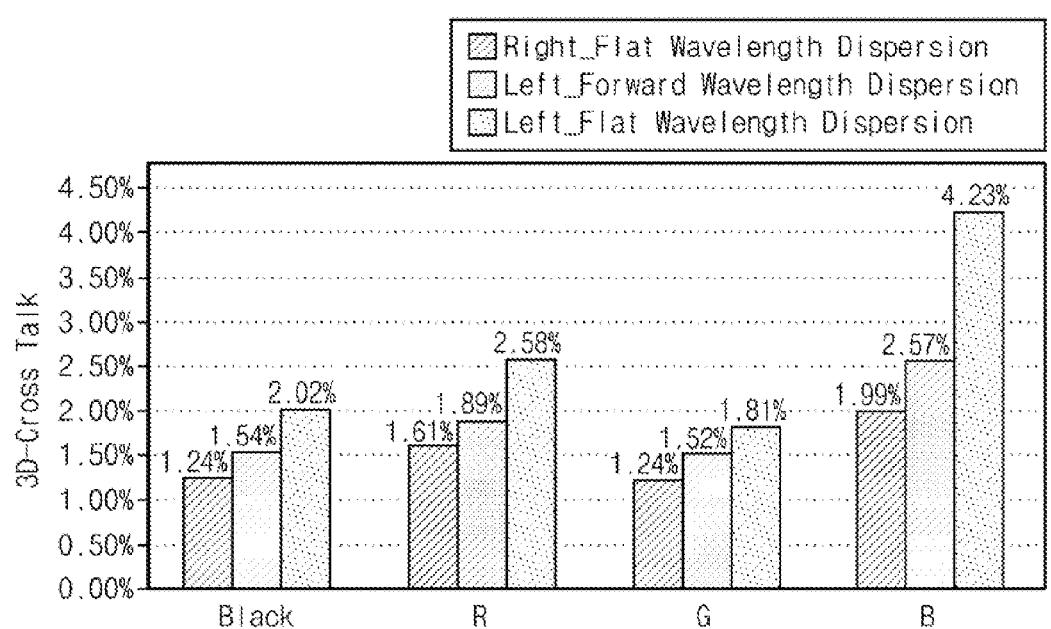
FIG. 8 is a graph showing crosstalk measured when the third retardation film is a flat wavelength dispersion retardation film, and the second retardation film is the forward or flat wavelength dispersion retardation film in the 3D image display apparatus shown in FIG. 1.

FIG. 8 is a graph showing a crosstalk measured when the third retardation film is the flat wavelength dispersion retardation film and the second retardation film is the forward or flat wavelength dispersion retardation film in the 3D image display apparatus shown in FIG. 1. In this case, the first retardation film is the flat wavelength dispersion retardation film.

Referring to FIG. 8, when the third retardation film is the flat wavelength dispersion retardation film, the crosstalk of the image passing through the polarization system for the right eye is about 2% or less in case of the red, green, blue, and black lights. This is because the phase of the image provided to the right eye is shifted by the third retardation film 235 by $-\lambda/4$ after being shifted by the first retardation film 220 by $\lambda/4$ even though retardation films having the same wavelength dispersion property are used. That is, the observer may watch the image with low crosstalk through the polarization system for the right eye.

In addition, the crosstalk of the left-eye image passing through the polarization system when the second retardation film is a forward wavelength dispersion retardation film is lower than the crosstalk of the left-eye image passing through the polarization system when the second retardation film is a flat wavelength dispersion retardation film. This is because the wavelength dispersion effect is enhanced when the image enters the left eye of the observer using the retardation films having a similar wavelength dispersion property as the first and second retardation films. On the contrary, the wavelength dispersion effect is reduced when the image is provided to the left eye of the observer using retardation films having different wavelength dispersion properties from each other as first and second retardation films.

Thus, when retardation films having different wavelength dispersion properties from each other are used as first and second retardation films, the observer may watch the image with low crosstalk through the 3D image display apparatus.

Figure 9:
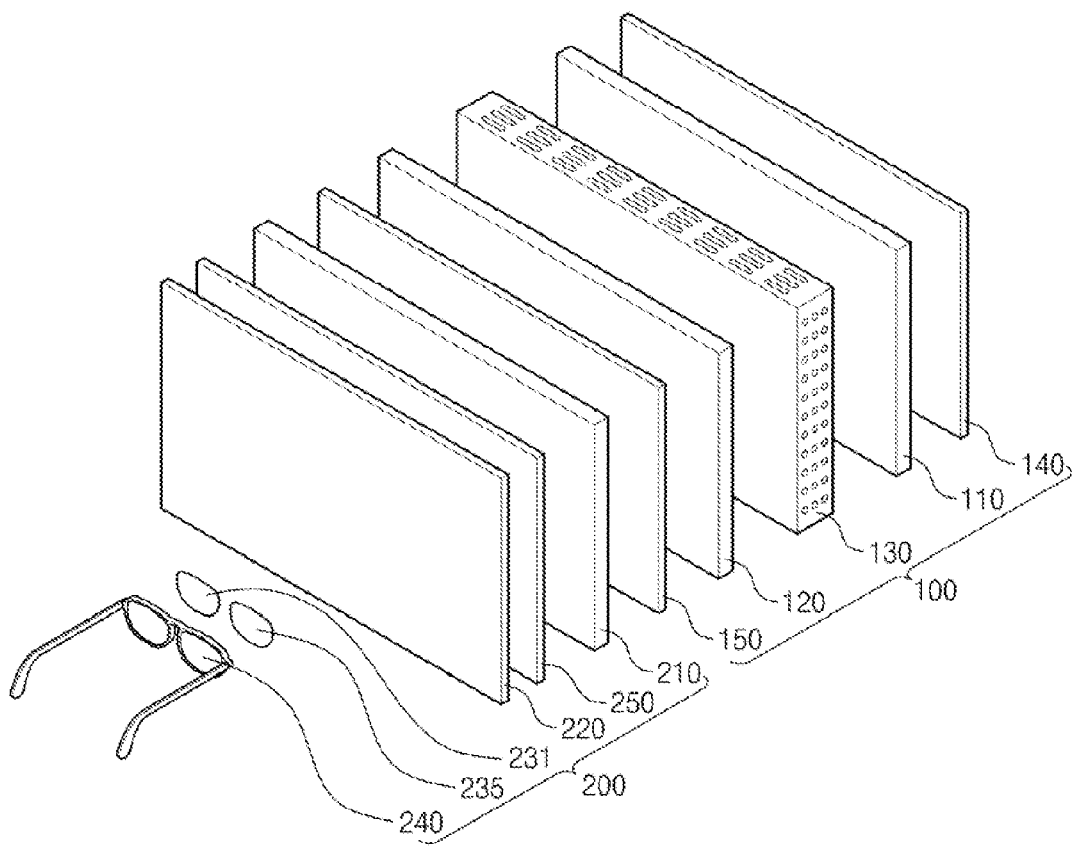
FIG. 9 is an exploded perspective view showing a 3D image display apparatus according to an exemplary embodiment of the present invention.
Figure 10:
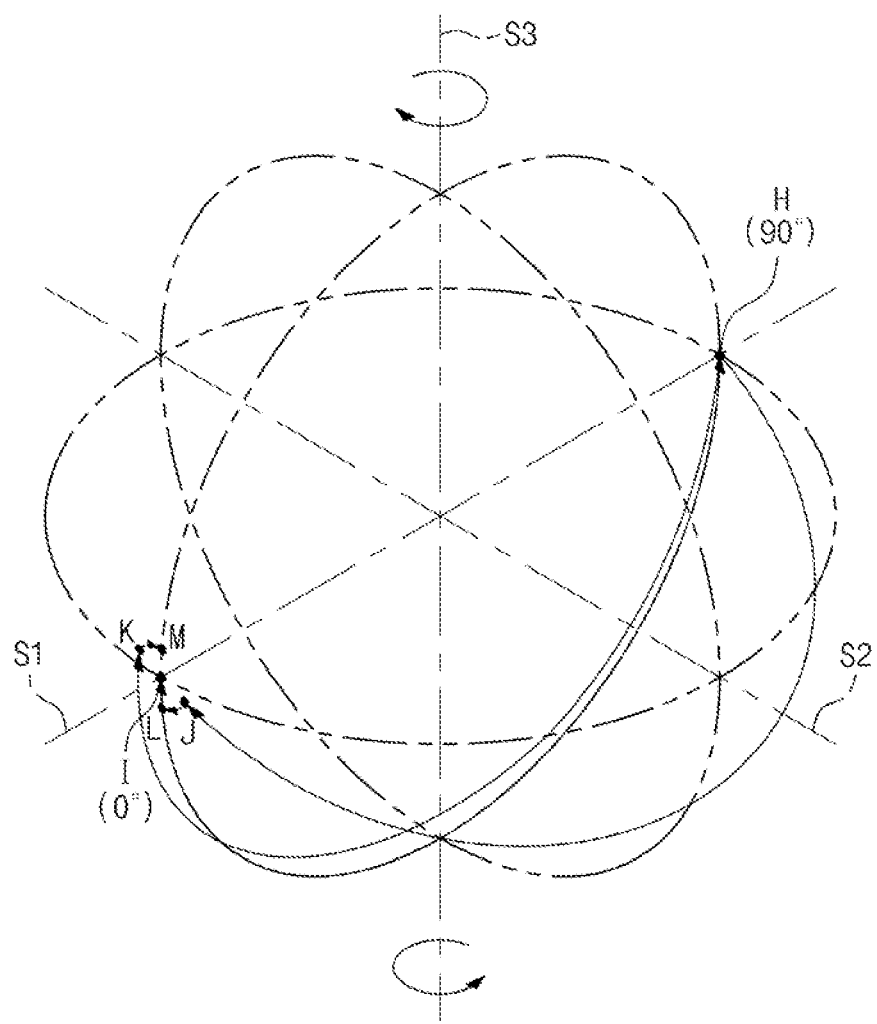
FIG. 10 is the Poincare sphere showing the phase shift of light passing through the shutter panel.
Figure 11:
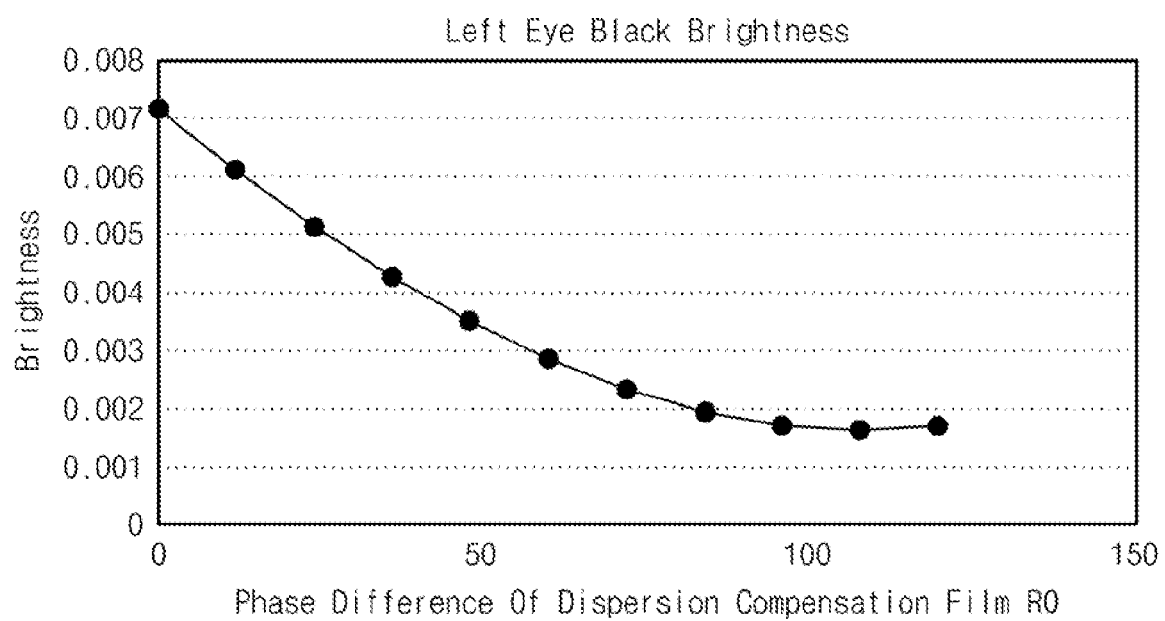
FIG. 11 is a graph showing brightness variation vs. phase difference of a dispersion compensation film.

FIG. 9 is an exploded perspective view showing a 3D image display apparatus according to an exemplary embodiment of the present invention. FIG. 10 is a view showing a phase shift of light passing through a shutter panel. FIG. 11 is a graph showing a brightness variation versus phase difference of a dispersion compensation film. In FIGS. 9 to 11, the same reference numerals denote the same elements in FIGS. 1 to 8, and thus detailed descriptions of the same elements will be omitted.

Referring to FIGS. 9 to 11, the 3D image display apparatus includes a display panel 100 and a polarization system 200.

The polarization system 200 includes a shutter panel 210, a dispersion compensation film 250, a first retardation film 220, a second retardation film 231, a third retardation film 235, and a third polarizing film 240.

The shutter panel 210 includes a first substrate (not shown), a second substrate (not shown) facing the first substrate, and a liquid crystal layer (not shown) disposed between the first substrate and the second substrate. The liquid crystal layer may include twisted nematic liquid crystals. The liquid crystal layer of the shutter panel 210 has a light alignment direction inclined with respect to the transmission axis of a first polarizing film 140, a second polarizing film 150, and a third polarizing film 240. As an example, the light alignment direction of the liquid crystal layer of shutter panel 210 may be inclined by about 45 degrees with respect to the transmission axis of the second polarizing film 150 of the display panel 100.

In addition, a distance (i.e., a cell gap) between the first substrate and the second substrate of the shutter panel 210 ranges between about 2.5 micrometers to about 3.5 micrometers. Furthermore, the phase of the light passing through the shutter panel 210 is shifted by about 440 nm to about 520 nm.

The dispersion compensation film 250 is disposed between the shutter panel 210 and the first retardation film 220 to compensate for a dispersion error in the light passing through the shutter panel 210. The dispersion compensation film 250 shifts the phase of the light incident thereon by about 40 nm to about 150 nm. In particular, as shown in FIG. 11, when the dispersion compensation film 250 shifts the phase of the light by about 100 nm to about 110 nm, the transmitted light suffers little reduction in brightness.

The dispersion compensation film 250 has a slow axis substantially parallel to the light alignment direction of the liquid crystal layer of the shutter panel 210. That is, the slow axis of the dispersion compensation film 250 may be inclined with respect to the transmission axis of the first polarizing film 140, the second polarizing film 150, and the third polarizing film 240. For example, the slow axis of the dispersion compensation film 250 is inclined at about 45 degrees to about 135 degrees.

Hereinafter, the process by which the observer perceives the stereoimage displayed on the 3D image display apparatus will be described in detail with reference to FIGS. 9 to 11.

The light impinging on the second polarizing film 150 is linearly polarized at about 90 degrees after passing through the second polarizing film 150 of the display panel 100, with the phase of the light passing through the second polarizing film 150 at the "H" position shown in FIG. 10.

The linearly polarized light incident onto the shutter panel 210 may be transmitted through the shutter panel 210 without a change in phase or with a change in phase. The amount of phase change of the transmitted linearly polarized light depends on the electric field used to align the twisted nematic liquid crystals in the shutter panel.

For instance, when a power source is applied to the shutter panel 210 and the twisted nematic liquid crystals are highly aligned, the light passing through the display panel 100 may pass through the shutter panel 210 with negligible change in phase.

When no power source is applied to the shutter panel 210 and the twisted nematic liquid crystals are not aligned, the phase of the light exiting from the display panel 100 is shifted by $\lambda/2$ after passing through the shutter panel 210. In this case, the twisted nematic liquid crystal layer of the shutter panel 210 shifts the phase of green light at a wavelength of about 550 nm in the visible range by $\lambda/2$. The twisted nematic liquid crystals, however, may not shift the phase of red light having a wavelength longer than about 550 nm or blue light having a wavelength shorter than about 550 nm by $\lambda/2$. The phase of the green light is shifted to the "I" position shown in FIG. 10 from the "H" position shown in FIG. 10 after passing through the shutter panel 210. However, the phases of the red light and the blue light are respectively shifted to the "J" position and the "K" position in FIG. 10 from the "H" position in FIG. 10 after passing through the shutter panel 210. In other words, the phase shift of light passing through the liquid crystal layer depends upon the wavelength of the light incident onto the twisted nematic liquid crystal layer. As a result, optical crosstalk occurs at some wavelengths of the light passing through the shutter panel 210.

The light passing through the shutter panel 210 is transmitted through the dispersion compensation film 250. The phases of red light and the blue light passing through the dispersion compensation film 250 are respectively shifted to the "L" position and the "M" position from the "J" position and the "K" position. Accordingly, the dispersion compensation film 250 controls the phases of all three light wavelengths passing through the shutter panel 210, thereby reducing the optical crosstalk. That is, the dispersion compensation film 250 compensates for the phases of the red light and the blue light, without changing the phase of the green light, such that the phases of red and blue lights become similar to the phase of the green light.

The light passing through the dispersion compensation film 250 enters the left eye of the observer after sequentially passing through the first retardation film 220, the second retardation film 231, and the third polarizing film 240. In parallel, the light passing through the dispersion compensation film 250 enters the right eye of the observer after sequentially passing through the first retardation film 220, the third retardation film 235, and the third polarizing film 240.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A polarization system for a 3D image display apparatus, comprising:
   a shutter panel that shifts a phase of incident light;
   a polarizing film disposed between the shutter panel and an observer;
   a first retardation film disposed between the shutter panel and the polarizing film;
   a second retardation film disposed between the polarizing film and the first retardation film to correspond to a left eye of the observer; and a third retardation film disposed between the polarizing film and the first retardation film to correspond to a right eye of the observer, wherein the first retardation film is a flat wavelength dispersion retardation film having a flat wavelength dispersion property, the second retardation film has a forward wavelength dispersion property or a reverse wavelength dispersion property, and the third wavelength dispersion film is a flat wavelength dispersion retardation film having the flat wavelength dispersion property.

2. The polarization system of claim 1, further comprising a dispersion compensation film disposed between the shutter panel and the first retardation film, wherein the shutter panel comprises a first substrate, a second substrate facing the first substrate, and a twisted nematic liquid crystal layer disposed between the first substrate and the second substrate.

3. The polarization system of claim 2, wherein the dispersion compensation film has a phase difference of about 40 nm to about 150 nm.

4. The polarization system of claim 3, wherein the dispersion compensation film has a slow axis substantially parallel to a light alignment direction of the twisted nematic liquid crystal layer of the shutter panel.

5. The polarization system of claim 2, wherein the twisted nematic liquid crystal layer of the shutter panel has a light alignment direction inclined with respect to a transmission axis of the polarizing film.

6. A 3D image display apparatus comprising:
a display panel that displays an image; and
a polarization system disposed between the display panel and an observer, the polarization system comprising:
a shutter panel disposed between the display panel and the observer;
a polarizing film disposed between the shutter panel and the observer;
a first retardation film disposed between the shutter panel and the polarizing film;
a second retardation film disposed between the polarizing film and the first retardation film to correspond to a left eye of the observer; and
a third retardation film disposed between the polarizing film and the first retardation film to correspond to a right eye of the observer,
wherein the first retardation film is a flat wavelength dispersion retardation film having a flat wavelength dispersion property, the second retardation film has a forward wavelength dispersion property or a reverse wavelength dispersion property, and the third wavelength dispersion film is a flat wavelength dispersion retardation film having the flat wavelength dispersion property.

7. The 3D image display apparatus of claim 6, further comprising a first polarizing film and a second polarizing film, which are respectively disposed on both surfaces of the display panel, wherein the second polarizing film is disposed between the display panel and the shutter panel.

8. The 3D image display apparatus of claim 7, further comprising a dispersion compensation film disposed between the shutter panel and the first retardation film, wherein the shutter panel comprises a first substrate, a second substrate facing the first substrate, and a twisted nematic liquid crystal layer disposed between the first substrate and the second substrate.

9. The 3D image display apparatus of claim 8, wherein the dispersion compensation film has a phase difference of about 40 nm to about 150 nm.

10. The 3D image display apparatus of claim 9, wherein the dispersion compensation film has a slow axis substantially parallel to a light alignment direction of the twisted nematic liquid crystal layer of the shutter panel.

11. The 3D image display apparatus of claim 8, wherein the twisted nematic liquid crystal layer of the shutter panel has a light alignment direction inclined with respect to a transmission axis of the polarizing film.

* * * * *